United States Patent
Rolph et al.

(10) Patent No.: US 7,540,203 B2
(45) Date of Patent: *Jun. 2, 2009

(54) DEVICE FOR MEASURING THE MASS RATE OF FLOW HAVING TWO MEASURING TUBES JOINED BY A STIFFENED CONNECTOR

(75) Inventors: Chris Rolph, Hartwell (GB); Vincent Cook, Earls Barton (GB); Yousif Hussain, Weston Favell (GB)

(73) Assignee: Krohne AG, Basel (CH)

( * ) Notice: Subject to any disclaimer, the term of this patent is extended or adjusted under 35 U.S.C. 154(b) by 0 days.

This patent is subject to a terminal disclaimer.

(21) Appl. No.: 11/781,560

(22) Filed: Jul. 23, 2007

(65) Prior Publication Data

US 2008/0047361 A1    Feb. 28, 2008

(30) Foreign Application Priority Data

Jul. 21, 2006    (DE)    ....................... 10 2006 034 274

(51) Int. Cl.
    *G01F 1/84*    (2006.01)
(52) U.S. Cl. ................................. 73/861.355
(58) Field of Classification Search ............ 73/861.355, 73/861.356, 861.357
    See application file for complete search history.

(56) References Cited

U.S. PATENT DOCUMENTS 7,275,449 B2 * 10/2007 Hussain et al. ......... 73/861.357

* cited by examiner

*Primary Examiner*—Jewel Thompson
(74) *Attorney, Agent, or Firm*—David S. Safran; Roberts Mlotkowski Safran & Cole, P.C.

(57) ABSTRACT

A device for measuring the mass rate of flow according to the Coriolis principle, with two measurement tubes at least in one section of which runs in a common plane, and a connector by which the two measurement tubes are connected to one another where they run in a common plane. The connector has a stiffening plate which is parallel to the common plane of the measurement tubes and which is attached to the two measurement tubes. At least one stiffening fin is provided on the stiffening plate so that the bending stiffness of the connector for bending in the common plane of the measurement tubes in which, generally, excitation vibrations of the measurement tubes also take place, is made greater than the torsional stiffness of the connector for torsional vibrations. As a result, the measurement accuracy of the Coriolis mass flow rate measurement device is improved.

20 Claims, 3 Drawing Sheets

DEVICE FOR MEASURING THE MASS RATE OF FLOW HAVING TWO MEASURING TUBES JOINED BY A STIFFENED CONNECTOR

BACKGROUND OF THE INVENTION

1. Field of the Invention

The invention relates to a device for measuring the mass rate of flow which works according to the Coriolis principle, with two measurement tubes which run in a common plane in at least one section, and a connecting means which connects the two measurement tubes to one another in the section in which they run in a common plane.

2. Description of Related Art

Therefore, this invention relates to those Coriolis mass flow rate measurement devices which have at least two measurement tubes which in the nonoscillating state run in a common plane, at least in sections, typically are specifically parallel to one another. In these Coriolis mass flow rate measurement devices with two measurement tubes, it is important to have at least one, but typically two measurement tubes, as described above. These connecting means determine the effective length of the measurement range since they fix the measurement tubes, and thus, define an oscillation node in the vibration excitation of the measurement tubes. Therefore these connecting means are also called node plates.

While the actual measurement range of the measurement tubes is located between these two node plates, the inlet-side and outlet-side sections of the measurement tubes in front of or behind the node plates establish the respective connection to the pipeline system in which the Coriolis mass flow rate measurement device is installed. In this connection, these inlet-side and outlet-side sections of the measurement tubes also contribute to vibration isolation of the Coriolis mass flow rate measurement device from the pipeline system.

In addition to determining the effective length of the measurement range of the Coriolis mass flow rate measurement device, the connecting means are also used to separate, in terms of frequency, the excitation vibrations of the measurement tubes which take place within the common plane of the measurement tubes from the vibrations which are orthogonal thereto. The greater the frequency spacing between these two vibrations, the less these two vibrations influence one another so that ultimately the influence on the measurement signal is correspondingly low. However, in this respect, in the Coriolis mass flow rate measurement devices with two or more measurement tubes known from practice, there is a need for improvement, since influencing the excitation vibrations in the common plane of the measurement tubes by the vibrations of the measurement tubes orthogonal thereto, and thus, ultimately, the interference of the measurement signal are still too great.

SUMMARY OF THE INVENTION

Accordingly, a primary object of the present invention is to devise such a Coriolis mass flow rate measurement device in which the excitation vibrations of the measurement tubes in the common plane of the measurement tubes are influenced as little as possible by the vibrations of the measurement tubes orthogonal thereto.

Proceeding from the initially described Coriolis mass flow rate measurement device, this object is achieved in that the connecting means has a stiffening plate which is located parallel to the common plane of the measurement tubes and which is attached to the two measurement tubes and that there is a stiffening fin on the stiffening plate.

Therefore, it is critical to the invention that, in addition to a stiffening plate which is attached to the two measurement tubes, for example, by means of welding, there is additionally another stiffening means, specifically a stiffening fin. This stiffening fin is attached to the stiffening plate so that the stiffness of the stiffening plate is influenced by the attachment of the stiffening fin.

Fundamentally, the stiffening fin can be provided in a different arrangement on the stiffening plate. According to one preferred development of the invention, however, it is provided that the stiffening fin is perpendicular to the stiffening plate. Furthermore according to a preferred development, it can be provided that the measurement tubes run straight at least in the region in which the stiffening plate is attached to them, and the stiffening fin is located perpendicular to the lengthwise direction of the measurement tubes.

If the stiffening fin stands perpendicular on the stiffening plate and the stiffening fin runs perpendicular to the lengthwise direction of the measurement tubes, as described above, the result is that the bending stiffness of the connecting means for bends in the common plane of the measurement tubes is greater than their torsional stiffness for torsional vibrations around the axis which lies in the plane of the lengthwise axes of the measurement tubes and which runs perpendicular to them. Since these torsional vibrations of the connecting means are produced when vibrations of the measurement tubes are excited opposite in phase and perpendicular to their common plane, and bending vibrations of the connecting means then occur in the common plane of the measurement tubes, when the measurement tubes in this plane are excited to excitation vibrations, these two types of vibrations, excitation vibrations, on the one hand, and vibrations perpendicular thereto, on the other, are influenced differently by the above described connecting means.

While the connecting means, specifically vibrations of opposing phase perpendicular to the common plane of the measurement tubes opposes a lower bending resistance, the bending resistance for vibrations of the measurement tubes in their common plane in which the vibration excitation takes place is greater. Altogether good frequency separation of excitation vibrations and vibrations of the measurement tubes perpendicular thereto is thus achieved, by which, as a result, the influence on the measurement signal by the mutual influence of excitation vibrations and vibrations perpendicular thereto is less.

Furthermore, it can be provided that the stiffening fin extends only over part of the stiffening plate. However, according to a preferred development of the invention, it is provided that the stiffening fin extends over the entire width of the stiffening plate.

Otherwise, the stiffening fin can have shapes which are different in cross section. According to a preferred development of the invention, it is provided that the stiffening fin runs completely in one plane. Alternatively, according to another preferred development of the invention, it is provided that the stiffening fin is L-shaped or T-shaped in cross section. Depending on the cross sectional shape of the stiffening fin, the bending stiffness of the connecting means can be influenced in order to achieve good frequency separation of the indicated vibrations of the measurement tube.

Fundamentally, it can be sufficient to provide a single stiffening fin on the stiffening plate. However, according to one preferred development of the invention, it is provided that a plurality of stiffening fins be located on the stiffening plate. In this way, the stiffness of the connecting means can be further increased.

Moreover, it can be sufficient for the connecting means to have only one stiffening plate. However, according to a preferred development of the invention, it is provided that the connecting means has two stiffening plates which are opposite one another and which are each attached to the two measurement tubes. In this connection, according to a preferred development of the invention it is also provided that the stiffening plates are aligned parallel to one another.

When there are two stiffening plates, it can be fundamentally sufficient for only one of the stiffening plates to have at least one stiffening fin. However, according to one preferred development of the invention, it is provided that the two stiffening plates have at least one stiffening fin. In particular, it is quite especially preferable that the two stiffening plates have the same number of identically made stiffening fins.

The connecting means with two stiffening plates can be made such that the stiffening plates are connected to only indirectly, specifically via the measurement tubes. However, according to a preferred development of the invention, it is provided that the two stiffening plates are connected to one another by means of a connecting plate. In this connection, it is especially preferred that the thickness of the connecting plate is greater than the thicknesses of the stiffening plates. When there is a connecting plate, especially according to one preferred development of the invention it is also provided that the connecting plate for each measurement tube has a hole through which the respective measurement tube is routed. In this connection, it also applies that the inside diameter of the holes preferably corresponds essentially to the outside diameter of the measurement tubes and that measurement tubes are preferably attached in the holes.

The invention is further explained below with reference to the accompanying drawings.

DETAILED DESCRIPTION OF THE INVENTION

Figure 1:
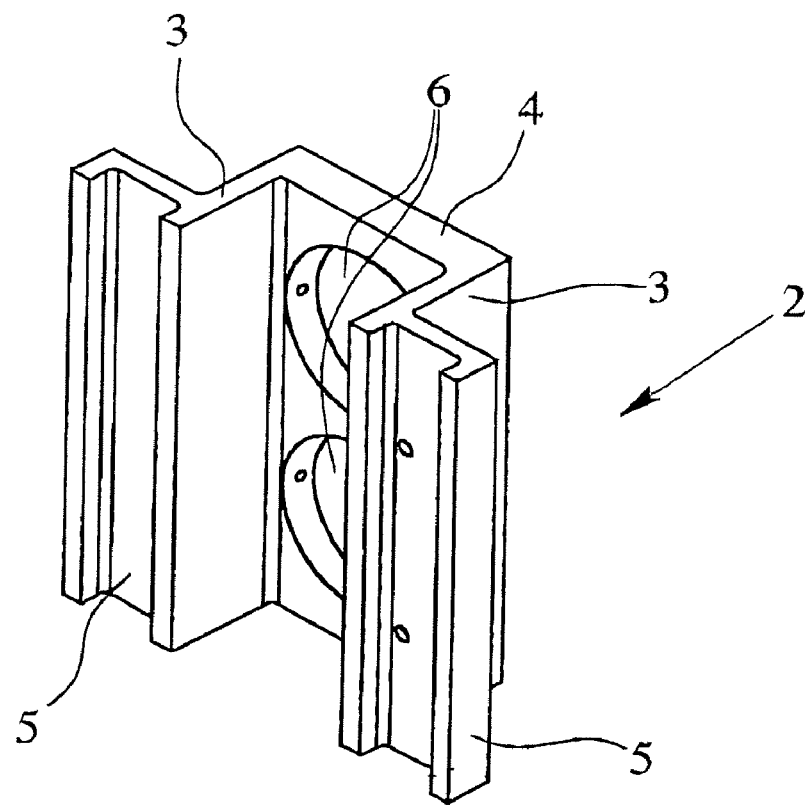
FIG. 1 is a perspective view of a connecting means for a Coriolis mass flow rate measurement device according to a first preferred embodiment of the invention.
Figure 2:
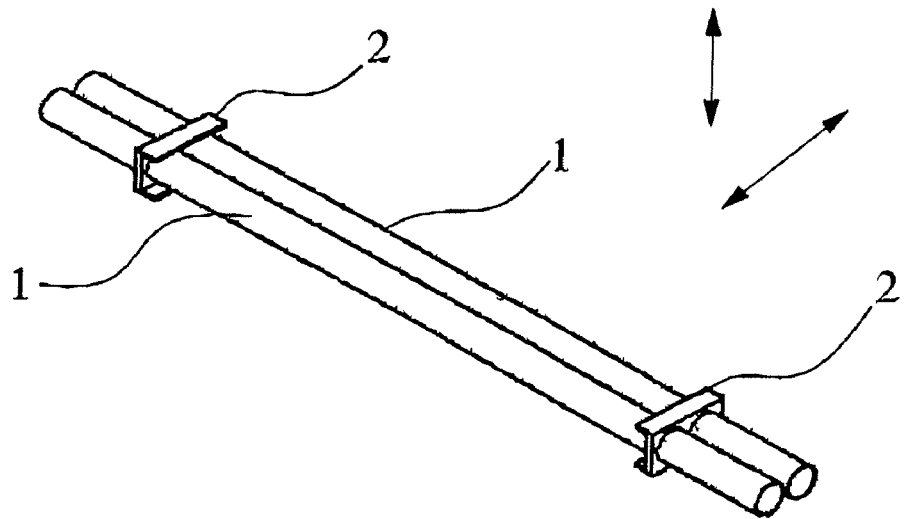
FIG. 2 is a perspective view showing two measurement tubes and the connecting means of the Coriolis mass flow rate measurement device which connect these measurement tubes according to a first preferred embodiment of the invention.

FIGS. 1 & 2 show a Coriolis mass flow rate measurement device according to a first preferred embodiment of the invention. Two straight measurement tubes 1, which run parallel to one another and which are provided with two connecting means 2, are shown. As is apparent from FIG. 1, and as is not shown in particular in schematic FIG. 2 for reasons of simplification, the connecting means 2 in cross section each have a generally U-shaped profile, two stiffening plates 3 being connected to one another by means of a connecting plate 4 such that the stiffening plates 3 are aligned parallel to one another and each is perpendicular to the connecting plate 4. The thickness of the stiffening plates 3 is less than the thickness of the connecting plate 4. Furthermore, there is a stiffening fin 5 on each of the stiffening plates 3. These stiffening fins 5 are L-shaped in cross section, and are attached to the respective stiffening plate 3 with the end of their long leg that is opposite the short leg. Furthermore, FIG. 1 shows that the stiffening fins 5 extend over the entire width of the respective stiffening plate 3. It holds that the connecting means 2 as described here using the first preferred embodiment of the invention can be made from one piece, but can also be assembled from several pieces which are then preferably welded to one another.

The above described construction of the connecting means 2 results in the bending resistance of the connecting means 2 for torsional vibrations being clearly less than for bending vibrations in the common plane of the measurement tubes 1. In this way, the above described advantage of good frequency separation of the vibrations of the measurement tubes 1 in their common plane or perpendicular therefore is achieved so that the measurement accuracy is increased.

In the connecting plate 4, there are two holes 6 with an inside diameter which corresponds essentially to the outside diameter of the measurement tubes 1. In this way, the connecting means 2 can be slipped over the measurement tubes 1 and then connected to them. According to the first preferred embodiment of the invention described here, it is provided that the connecting means 2 are produced from high-grade steel so that they can be welded to the measurement tubes 1 which, for their part, are made of titanium.

Figure 3:
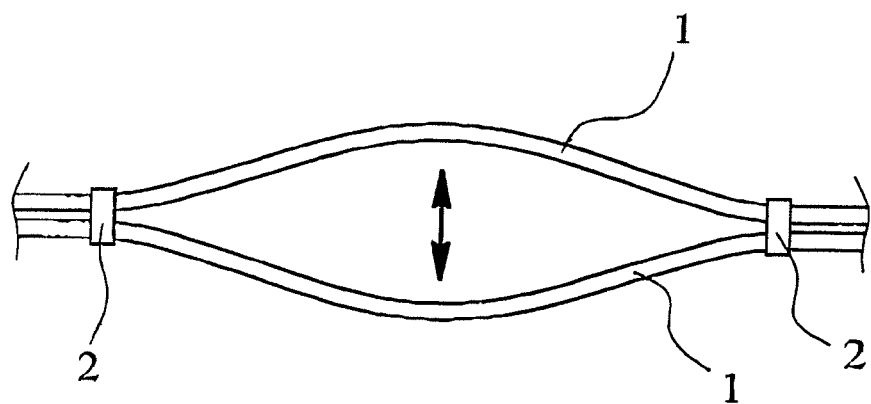
FIG. 3 is a top view schematically showing the vibration excitation of the measurement tubes of the Coriolis mass flow rate measurement device according to a first preferred embodiment of the invention.
Figure 4:
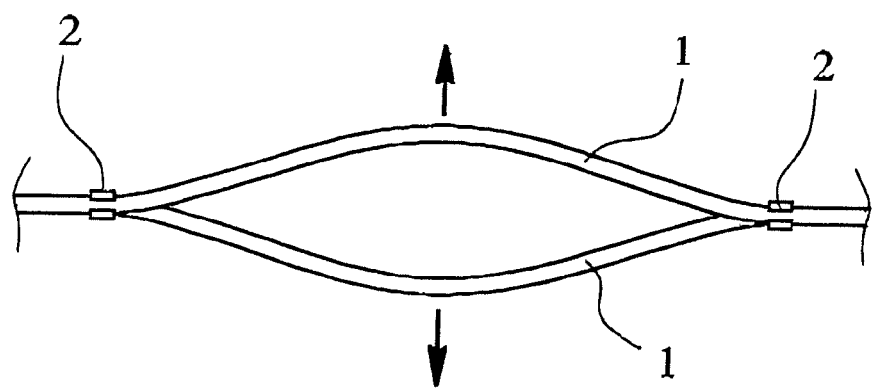
FIG. 4 is a side view schematically showing vibrations of the measurement tubes of the Coriolis mass flow rate measurement device according to a first preferred embodiment of the invention perpendicular to the plane of vibration excitation.

At this point, it is apparent in detail from FIGS. 3 & 4 how the connecting means 2 act under different vibrations. Here, the connecting means 2 are again shown only schematically. FIG. 3 shows the two measurement tubes connected with two connecting means 2 in a top view, and with maximum deflection of an excitation vibration which takes place in the common plane of the measurement tubes 1 and in which the measurement tubes 1 are excited in phase opposition to one another.

It can be seen that, for these excitation vibrations, the connecting means 2 are stressed by the vibrating measurement tubes 1 such that bending vibrations of the connecting means 2 occur in the common plane of the measurement tubes 1. For this purpose, the stiffening plates 3 must likewise execute these bending vibrations in a corresponding plane. These vibrations are opposed by a very high bending resistance associated with the compression of the stiffening plates 3 necessary for this purpose, on one side, or stretching on the opposing side, especially by providing the respective additional stiffening fin 5.

In contrast, the connecting means 2 for opposing-phase vibrations of the measurement tubes 1 can be easily excited into torsional vibrations perpendicular to the plane of the vibration excitations, as is apparent from FIG. 4. The connecting fins 5 specifically provide a much lower resistance to these torsional vibrations. Thus, the already addressed good frequency separation of these two types of vibrations is achieved by which, ultimately, there is only a slight influence on the measurement signal by vibrations of the measurement tubes which take place perpendicular to the excitation vibrations.

Figure 5:
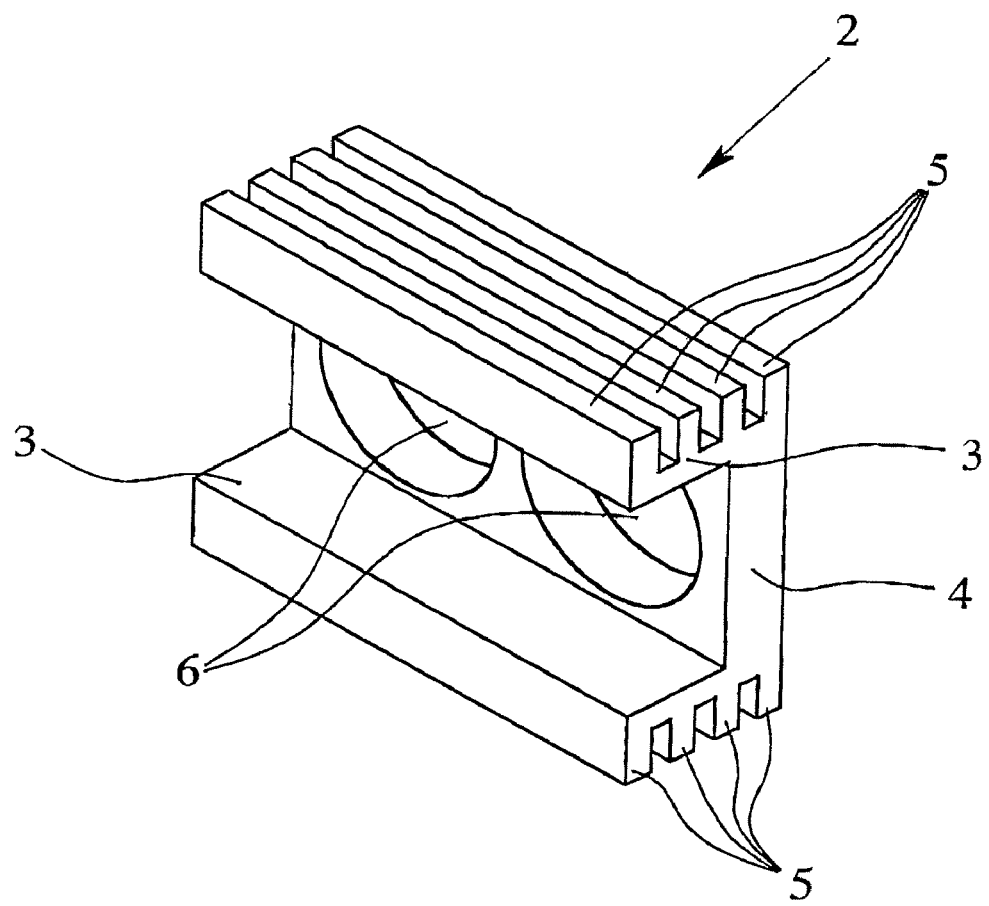
FIG. 5 is a perspective view of a connecting means for the Coriolis mass flow rate measurement device according to a second preferred embodiment of the invention.

FIG. 5 shows a connecting means 2 for a Coriolis mass flow rate measurement device according to a second preferred embodiment of the invention. Here, the connecting means 2 is again essentially U-shaped, with two stiffening plates 3 which are parallel and opposite one another, and which are connected to one another by a thicker connecting plate 4.

In this case, each stiffening plate 3 has a plurality of stiffening fins 5, specifically four stiffening fins 5 each, which project outward perpendicular to the stiffening plates 3. Here, the stiffening fins 5 are not L-shaped, but are essentially rectangular in cross section so that the entirety of each stiffening fin 5 runs in a single plane. The arrangement and operation of the connecting means 2 for the Coriolis mass flow rate measurement device according to the second preferred embodiment of the invention correspond to those as described in conjunction with the first preferred embodiment of the invention.

What is claimed is:

1. Device for measuring the mass rate of flow which works according to the Coriolis principle, comprising:
    two measurement tubes, at least one section of which run in a common plane, and
    connecting means which connects the two measurement tubes to one another in the at least one section in which they run in a common plane,
    wherein the connecting means has at least one stiffening plate which is arranged parallel to the common plane of the measurement tubes and which is attached to the two measurement tubes, and wherein at least one stiffening fin is provided on the at least one stiffening plate.

2. Device for measuring the mass rate of flow as claimed in claim 1, wherein the at least one stiffening fin extends perpendicularly from the at least one stiffening plate.

3. Device for measuring the mass rate of flow as claimed in claim 2, wherein the measurement tubes run straight, at least in the region in which the stiffening plate is attached to them, and wherein the at least one stiffening fin extends perpendicular to a lengthwise direction of the measurement tubes.

4. Device for measuring the mass rate of flow as claimed in claim 1, wherein the stiffening fin extends over the entire width of the stiffening plate.

5. Device for measuring the mass rate of flow as claimed in claim 1, wherein the stiffening fin runs completely in one plane.

6. Device for measuring the mass rate of flow as claimed in claim 1, wherein the stiffening fin is L-shaped or T-shaped in cross section.

7. Device for measuring the mass rate of flow as claimed in claim 1, wherein the at least one stiffening fin comprises a plurality of stiffening fins on the at least one stiffening plate.

8. Device for measuring the mass rate of flow as claimed in claim 1, wherein the connecting means has two stiffening plates which are arranged opposite one another and each of which is attached to the two measurement tubes.

9. Device for measuring the mass rate of flow as claimed in claim 8, wherein the stiffening plates run parallel to one another.

10. Device for measuring the mass rate of flow as claimed in claim 8, wherein each of the two stiffening plates has at least one stiffening fin.

11. Device for measuring the mass rate of flow as claimed in claim 10, wherein the two stiffening plates are connected to one another by means of a connecting plate.

12. Device for measuring the mass rate of flow as claimed in claim 11, wherein the thickness of the connecting plate is greater than the thicknesses of the stiffening plates.

13. Device for measuring the mass rate of flow as claimed in claim 11, wherein the connecting plate has a hole for each measurement tube through which the respective measurement tube is routed.

14. Device for measuring the mass rate of flow as claimed in claim 13, wherein the inside diameter of the holes corresponds essentially to the outside diameter of the measurement tubes.

15. Device for measuring the mass rate of flow as claimed in claim 13, wherein the measurement tubes are attached in the holes.

16. Device for measuring the mass rate of flow as claimed in claim 1, wherein the measurement tubes run straight, at least in the region in which the stiffening plate is attached to them, and wherein the at least one stiffening fin extends perpendicular to a lengthwise direction of the measurement tubes.

17. Device for measuring the mass rate of flow as claimed in claim 1, wherein the connecting means has two stiffening plates which are arranged opposite one another and each of which is attached to the two measurement tubes by a connecting plate to which the stiffening plates are attached.

18. Device for measuring the mass rate of flow as claimed in claim 17, wherein the thickness of the connecting plate is greater than the thicknesses of the stiffening plates.

19. Device for measuring the mass rate of flow as claimed in claim 17, wherein the connecting plate has a hole for each measurement tube through which the respective measurement tube is routed, the inside diameter of the holes corresponding essentially to the outside diameter of the measurement tubes, and the measurement tubes being attached in the holes.

20. Device for measuring the mass rate of flow as claimed in claim 17, wherein the each of two stiffening plates has at least one stiffening fin.

* * * * *